(12) United States Patent
Sundaram

(10) Patent No.: US 10,386,568 B2
(45) Date of Patent: Aug. 20, 2019

(54) COMBINED REAR COVER AND ENHANCED DIFFUSED REFLECTOR FOR DISPLAY STACK

(71) Applicant: INTEL CORPORATION, Santa Clara, CA (US)

(72) Inventor: Arvind Sundaram, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/163,590

(22) Filed: May 24, 2016

(65) Prior Publication Data
US 2016/0377795 A1 Dec. 29, 2016

(30) Foreign Application Priority Data
Jun. 24, 2015 (IN) .......................... 1882/DEL/2015

(51) Int. Cl.
G09G 3/34 (2006.01)
F21V 8/00 (2006.01)

(52) U.S. Cl.
CPC .......... *G02B 6/0055* (2013.01); *G02B 6/0036* (2013.01); *G02B 6/0065* (2013.01); *G02B 6/0088* (2013.01); *G09G 3/3406* (2013.01); G09G 2300/04 (2013.01)

(58) Field of Classification Search
CPC .. G02B 6/0055; G02B 6/0036; G02B 6/0088; G09G 3/3406; G09G 2300/04
USPC ................. 345/102, 690–697; 362/606–607
See application file for complete search history.

(56) References Cited

U.S. PATENT DOCUMENTS

| | | | | |
|---|---|---|---|---|
| 5,961,198 A | * | 10/1999 | Hira | G02B 6/0036 349/65 |
| 6,474,824 B1 | * | 11/2002 | Wada | G02B 6/0038 362/330 |
| 2010/0165241 A1 | * | 7/2010 | Kim | G02B 6/0053 349/61 |
| 2010/0275163 A1 | | 10/2010 | Gillespie et al. | |
| 2012/0270150 A1 | | 10/2012 | Smeets | |
| 2014/0146560 A1 | | 5/2014 | Kim et al. | |
| 2015/0009708 A1 | | 1/2015 | Huang | |
| 2015/0042347 A1 | | 2/2015 | Wamble | |

OTHER PUBLICATIONS

International Search Report and Written Opinion received for PCT Patent Application No. PCT/US2016/033970, dated Sep. 6, 2016, 18 pages.

* cited by examiner

*Primary Examiner* — Michael Pervan

(57) ABSTRACT

Disclosed herein is a combined enhanced diffused reflector and back cover for a display stack. The back cover may be assembled proximate to a light guide panel layer of a display stack to receive light from a light guide panel and to reflect and diffuse light received from the light guide panel back to the light guide panel.

23 Claims, 10 Drawing Sheets

| |
|---|
| Cover Glass (~0.7 mm) - 250 |
| OCA (~0.075 mm) - 216 |
| Touch Film (~0.05 mm) - 240 |
| OCA (~0.025 mm) - 216 |
| PET Protector (~0.055 mm) - 222 |
| OCA (~0.2 mm) - 216 |
| LCD Layer (~1.35 mm) - 230 |
| Tape (~0.3 mm) - 212 |
| Pressure Film (~0.3 mm) - 214 |
| Tape (~0.2 mm) - 210 |
| DBEF (~0.26 mm) - 208 |
| VPR (~0.275 mm) - 206 |
| HPR (~0.215 mm) - 204 |
| QDEF (~0.21 mm) - 202 |
| LGP (~1.5 mm) - 220 |
| Combined EDR and Back Cover (~0.2 mm) - 210 |

Display Stack 200 (~5.72 mm)

Deposit a plurality of reflective particles on an internal surface of a back cover for a display stack, the one or more reflective particles to reflect light.
410

Pit portions of the internal surface to diffuse the reflected light.
420

Receive, at a back cover of a display stack, light emitted from a light guide panel layer.
610

Reflect a portion of the received light back at the light guide panel layer in a diffused pattern.
620

COMBINED REAR COVER AND ENHANCED DIFFUSED REFLECTOR FOR DISPLAY STACK

CROSS-REFERENCE TO RELATED APPLICATIONS

This application claims the benefit of and priority to previously filed India Patent Application Serial Number 1882/DEL/2015 filed Jun. 24, 2015, the subject matter of which is incorporated herein by reference in its entirety.

TECHNICAL FIELD

Embodiments herein generally relate to display stacks and particularly to integrating an enhanced diffused reflector into a rear cover of a display stack.

BACKGROUND

Modern displays are a combination of many components, often referred to as a display stack. For example, a display stack may include cover glass, a touch panel, a liquid crystal display (LCD) matrix, dual brightness enhanced films, a light guide panel, an enhanced diffused reactors, a light source, etc. With respect to all in one devices; the display components can account for 60 to 70%, or more, of the entire thickness of a device. This is significant as modern trends continue to require thinner and thinner devices.

BRIEF DESCRIPTION OF THE DRAWINGS

FIG. 2 illustrates another displays tack including a combined EDR back cover according to an embodiment.

FIG. 4 illustrates a logic flow according to an embodiment.

FIG. 6 illustrates another logic flow according to an embodiment.

DETAILED DESCRIPTION

Various embodiments may be generally directed to a combined rear cover and enhanced diffused reflector (EDR) for a display stack of an electronic display. More specifically, a rear cover of a display stack may also function as an EDR for the display stack. As such, the display stack may not have a conventional EDR. Accordingly, the thickness of the display stack may be reduced as compared to conventional display stacks while maintaining the same functionality.

A liquid crystal display (LCD) is backlit. More specifically, a LCD layer of the display stack does not emit light (unlike organic light emitting diode (OLED) display or plasma display). In particular, a backlight is directed towards the LCD layer of the display stack. It is noted, that in some contexts, the LCD layer is referred to as an "open cell" layer or an "LCD matrix." As used herein, LCD layer is not intended to be limiting but is merely used for convenience and clarity in referring to the open cell portion of the display stack corresponding to the active LCD components.

During operation, light is emitted from a backlight portion of a display stack (e.g., light emitting diodes (LEDs), cold-cathode florescent lamps (CCFLs), or the like) and converted into a sheet of light via at least a light guide panel (LGP). Light emitted from the top surface of the LGP passes through the LED layer. However, light emitted from the bottom surface of the LGP is reflected back into the LGP to increase power to light conversion and reduce power loss. Conventionally, an EDR layer is added as a bottom layer in the display stack, below the LPG. The present disclosure provides to remove the EDR layer and provide a combined EDR and bottom cover for the display stack. In some display stacks, a conventional EDR may be between 125 and 200 microns thick. As such, a significant reduction in the overall thickness of the display stack may be achieved by the present disclosure. Furthermore, many conventional EDRs are made of paper and are prone to scratching during assembly or over time due to being assembled next to the LPG.

In some examples, the bottom cover of the display stack may be vacuum deposited with a reflective material to reflect light emitted from the LGP back to the LGP. Additionally, in some examples, the bottom cover may also be pitted to diffuse the light reflected back to the LGP.

Figure 1:
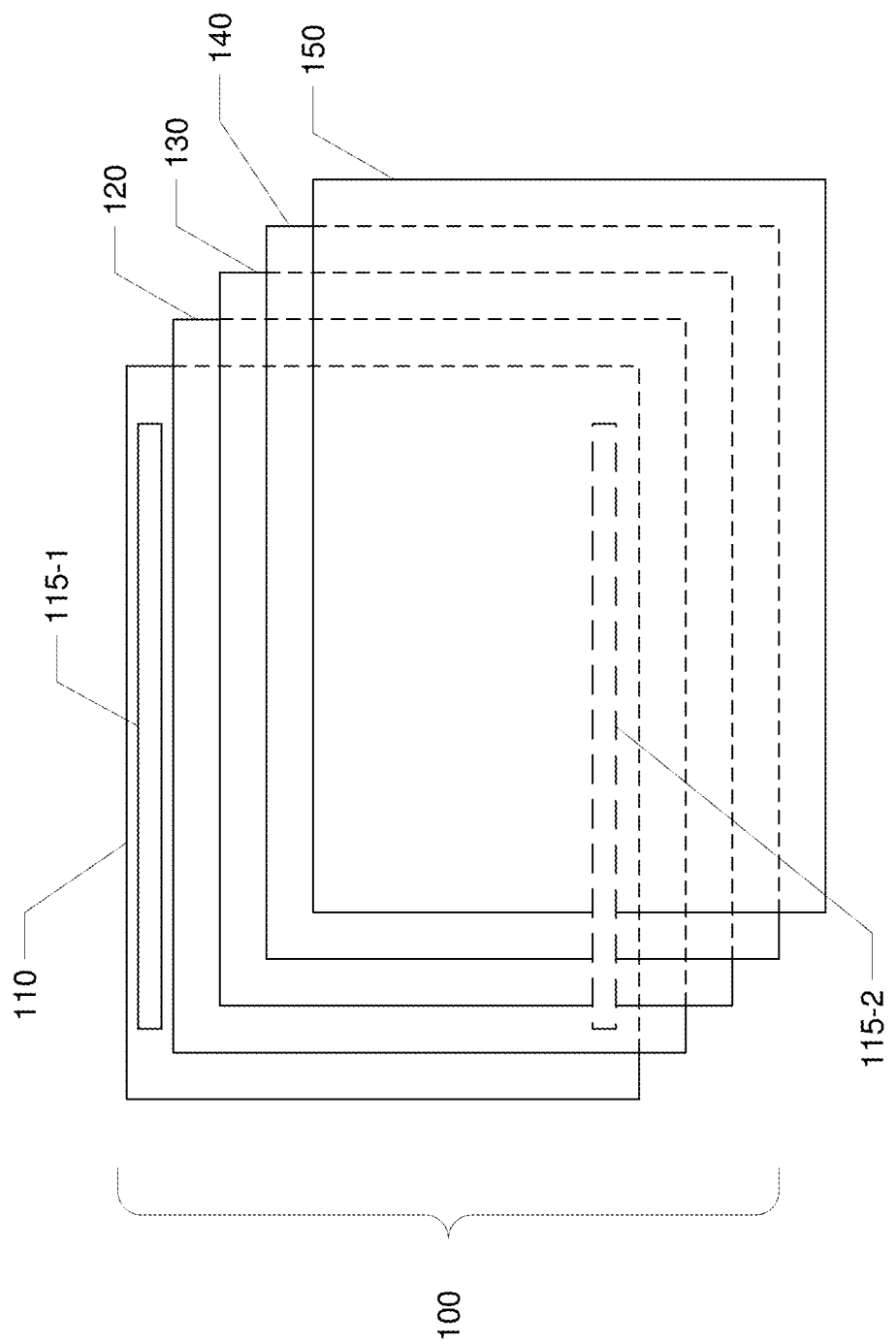
FIG. 1 illustrates a display stack including a combined EDR back cover according to an embodiment.

FIG. 1 illustrates a block diagram of a display stack 100. In various examples, the display stack 100 may include a combined EDR and back cover 110, backlight portions 115-1 and 115-2, a light guide panel (LGP) layer 120, an LCD layer 130, a touch layer 140, and a protective layer 150. It is important to note, that the display stack 100 can include more layers than depicted, less layers than depicted, or different configurations of layers that depicted. For example, the display stack 100 may be provided without the touch layer 140. Additionally, it is noted, that many layers commonly found in a display stack (e.g., refer to FIG. 2) are omitted from this figure for purposes of clarity. However, this is not intended to be limiting.

The combined EDR back cover 110 is disposed directly behind the LGP layer 120. Accordingly, light emitted from the bottom of the LGP layer 120 may be reflected and diffused by the back cover 110. In general, the bottom cover 110 may be formed from any suitable material. In some examples, the bottom cover 110 may be aluminum, plastic, mild steel, carbon fiber-reinforced polymer, carbon fiber-reinforced plastic, carbon fiber-reinforced thermoplastic, or the like). Furthermore, the back cover 110 may be mirrored and/or pitted to reflect and/or diffuse light emitted from the LGP layer 120 back to the LGP layer 120. In particular, the back cover 110 may be polished to have a mirrored surface, may have reflective material deposited thereon, and may also be pitted.

The backlight portions 115-1 and 115-2 may comprise a variety of light sources (e.g., LEDs, CCFLs, or the like) configured to emit light into the LGP layer 120. For example, the backlight portions 115-1 and 115-2 may be edge mounted LEDs. The LGP layer 120 may include one or more panels or components to channel and diffuse the light emitted from the backlight portions 115-1 and 115-2 to the LCD layer 130. The LCD layer 130 may include one or more panels or components to control portions of the display (e.g., pixels). It is to be appreciated that a variety of LCD technologies exists and the present disclosure may be implemented with any of these or future such display technologies. For example, the present disclosure may be implemented using passive and/or active LCD technology. As a particular example, the LCD layer 130 may include thin-film transistor (TFT) components, twisted nematic (TN) components, in plane switching (IPS) components, vertical alignment (VA) components, and/or the like. The touch layer 140 may comprise any of a variety of touch films, tapes, or components configured to register touch. The protective layer 150 may comprise one or more films, layers, or components to protect the LCD touch layer 140, the LCD layer 130, and the display stack 100. For example, the protective layer 150 may be glass, acrylic, or the like.

The display stack 100 may be implemented in a variety of displays and/or devices including displays. For example, the display stack 100 may be implemented in a monitor, a television, a smart phone, a Ultrabook, a tablet, a laptop, a wearable computing device (e.g., a watch, glasses, a headset, or the like), a home automation device (e.g., a thermostat, a control panel, or the like).

FIG. 2 depicts a more detailed block diagram of a display stack 200. Additionally, this figure depicts example thicknesses for the display stack 200. It is noted, that these example thicknesses are given for purposes of illustration only and are not intended to be limiting.

As depicted, the display stack 200 may include a combined EDR and back cover 210. In some examples, the combined EDR and back cover 210 may be approximately 0.2 millimeters (mm). It is noted, that the combined EDR and back cover the present disclosure may be between 0.002 mm and 0.008 mm thicker than a conventional back cover due to the deposition of the reflective material (refer to FIGS. 3A-3B). The display stack 200 may include a LGP layer 220. In some examples, the LGP layer 220 may be approximately 1.5 mm. The display stack 200 may include a quantum dot enhancement film (QDEF) 202. In some examples, the QDEF 202 may be approximately 0.21 mm. The display stack 200 may include a H Prism (HPR) layer 204. In some examples, the HPR layer 204 may be approximately 0.215 mm. The display stack 200 may include a V Prism (VPR) layer 206. In some examples, the VPR layer 206 may be approximately 0.275 mm. The display stack 200 may include a dual brightness enhanced film (DBEF) 208. In some examples, the DBEF 208 may be approximately 0.26 mm. The display stack 200 may include a tape layer 212 (e.g., adhesive, dual sided adhesive, etc.) In some examples, the tape layer 212 may be approximately 0.3 mm. The display stack 200 may include a pressure film layer 214. In some examples, the pressure film layer 214 may be approximately 0.3 mm. The display stack 200 may include another tape layer 212, adding approximately another 0.2 mm to the display stack 200 thickness. The display stack 200 may include an LCD layer 230. In some examples, the LCD layer 230 may be approximately 1.35 mm. The display stack 200 may include an optically clear adhesive (OCA) layer 216. In some examples, the OCA layer 216 may be approximately 0.2 mm. The display stack 200 may include a PET protector layer 222. In some examples, the PET protector layer 222 may be approximately 0.055 mm. The display stack 200 may include another OCA layer 216, adding approximately another 0.025 mm to the display stack 200 thickness. The display stack 200 may include a touch film layer 240. In some examples, the touch film layer 240 may be approximately 0.05 mm. The display stack 200 may include another OCA layer 216, adding approximately another 0.075 mm to the display stack 200 thickness. The display stack 200 may include cover glass 250. In some examples, the cover glass 250 may be approximately 0.7 mm.

As noted above, the example display stack 200 and particularly, the thickness of the various layers is given for illustration only. However, using this example, the display stack 200 may have a thickness of approximately 5.72 mm.

It is important to note, that the combined EDR and back cover 210 is placed behind the LGP layer 220. In particular, the display stack 200 does not include a separate EDR layer, as would a conventional display stack. Conventional EDR layers may be between 0.15 mm and 3 mm thick. As such, the display stack 200 may be between 3% and 6% thinner than a conventional display stack.

Figure 3A:
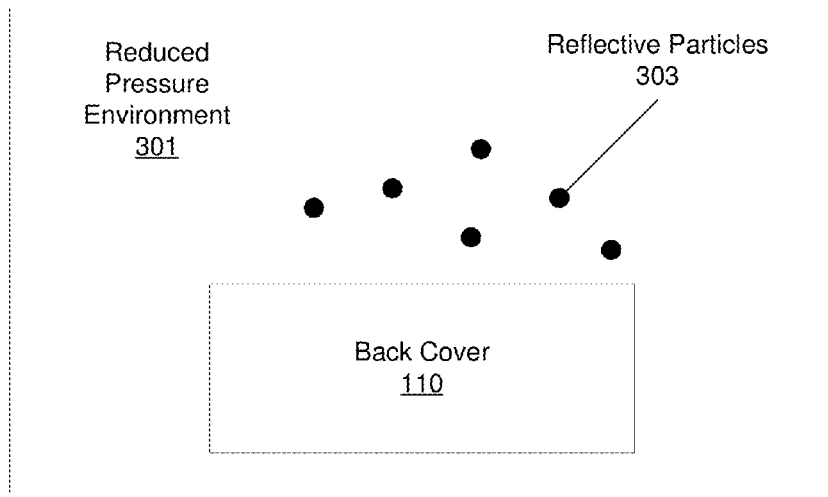
FIGS. 3A-3B illustrates a combined EDR and back cover of a displays stack during manufacturing according to an embodiment.
Figure 3B:
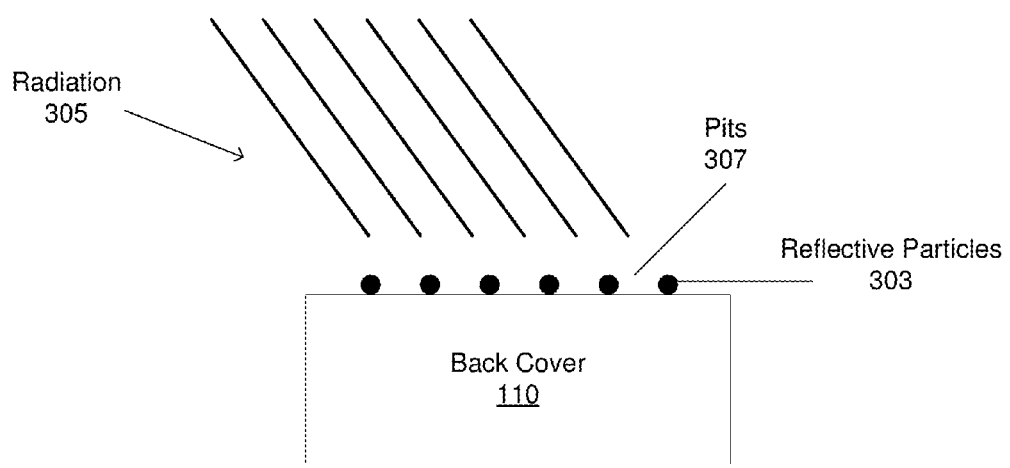

FIGS. 3A-3B and FIG. 4 depicts a process for forming the combined EDR and back cover 110 and/or 210 of the display stacks 100 and 200 shown in FIGS. 1 and 2. Turning more specifically to FIG. 4, a logic flow 400 for forming a combined EDR and back cover, according to at least one embodiment of the present disclosure, is illustrated. The logic flow 400 is described with reference to FIGS. 3A-3B. However, the logic flow 400 may be implemented to form a combined EDR and back cover using any suitable material and/or process. Examples are not limited in this context.

The logic flow 400 may begin at block 410. At block 410 "deposit a plurality of reflective particles on an internal surface of a back cover for a displays tack, the one or more reflective particles to reflect light," reflective particles may be deposited onto an internal surface of the back cover of a display stack. In some examples, the reflective particles may be deposited onto the back cover through one or more vapor deposition processes. In particular, the back cover may be placed in a reduced pressure environment and the reflective particles introduced into the reduced pressure environment such that the reflective particles are deposited onto the back cover. For example, FIG. 3A depicts the back cover 110 placed in a reduced pressure environment 301. Reflective particles 303 have been introduced into the reduced pressure environment, and due to the reduced pressure, will deposit onto the back cover 110. It is important to note, that the reflective particles 303 are not drawn to scale and also a limited number of particles are depicted for purposes of clarity. For example, the reflective particles may be deposited at the atomic level or at the near-atomic level. With some examples, a layer or reflective particles 303 of between 0.002 and 0.008 mm thick may be deposited onto the back cover 110.

In some examples, it may be said that the back cover has a "mirrored finish" or a "mirrored surface" as a result of depositing the reflective particles on the inside surface of the back cover. With some examples, the reflective particles 303 may be deposited onto the back cover (or more specifically, an internal surface of the back cover) via a physical vapor deposition (PVD) process. With some examples, the reflective particles 303 may be deposited an internal surface of the back cover via a chemical vapor deposition (CVD) process. In some examples, the CVD process may be carrier a low-pressure CVD process, a plasma-enhanced CVD process, or a plasma-assisted CVD process.

Continuing to block 420 "pit portions of the internal surface to diffuse the reflected light" portions of the internal surface (e.g., with the reflective particles deposited thereon) may be pitted such that the reflected light is diffused. In particular, the internal surface of the back cover 110 may be pitted (either before or after deposition of the reflective particles) such that light reflected from the internal surface is diffused. With some examples, the internal surface of the back cover may be pitted by exposure to radiation, acid, mechanical means, or the like. For Example, FIG. 3B depicts the back cover 110 with reflective particles 303 deposited thereon. Additionally, this figure depicts radiation 305 incident upon the internal surface of the back cover 110 to form pits 307 in portions of the back cover 110. It is important to note, that the pitting may not be uniform as depicted. Furthermore, the pitting may not completely expose the internal surface. More specifically, pits 307 may be formed in the layer of reflective of particles 303 deposited onto the back cover 110.

In general, the reflective particles 303 may be any particle or material having properties that reflect light. In some examples, the reflective particles 303 may be gold, silver, aluminum, or various alloys containing gold, silver and/or aluminum. The particular material for the reflective particles 303 may be selected to provide a desired level of reflectance at a particular wavelength of light.

Figure 5:
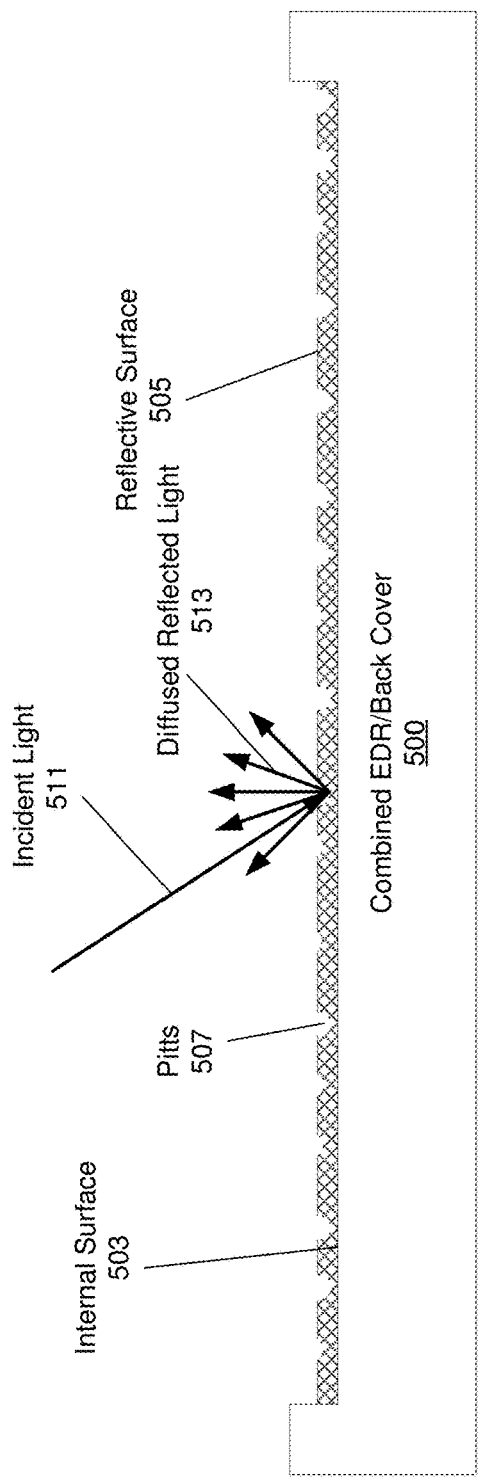
FIG. 5 illustrates a combined EDR and back cover according to another embodiment.

FIG. 5 illustrates a block diagram of a combined EDR and back cover 500, arranged according to at least one example of the present disclosure. As depicted, the combined EDR and back cover 500 having an internal surface 503. The internal surface 503 may be formed and/or shaped to support and/or cover a display stack. For example, in practice, the components of a display stack (e.g., the display stack 200) may be assembled together and may be secured or protected in a housing, including the back cover 500. The back cover 500 may have the internal surface 503 which is configured to be disposed internal to the display stack. Said differently, the internal surface 503 may face the components of the display stack (e.g., the LGP layer, or the like).

The internal surface 503 has reflective particles disposed thereon to form a reflective surface 505. For example, the internal surface 503 may have reflective particles 303 disposed thereon using a vacuum process as described above. The reflective particles are disposed on the internal surface in a thin (e.g., 0.001 mm to 0.01 mm) layer to form the reflective surface 505. Accordingly, during operation, when light (e.g., radiation 305, or the like) is emitted from an LGP layer disposed adjacent to the back cover, the reflective surface 505 reflects a portion of the light back to the LGP layer.

Additionally, the reflective surface may have pits 507 in the reflective surface to diffuse the reflected light. The pits 507 may be portions of the reflective surface that are removed or may be voids in the reflective surface. As depicted, the voids or pits 507 are may not be uniformly distributed over the reflective surface 505. Furthermore, the pits 507 may not have uniform shape. In some examples, the pits may be micro pits or micro fractures formed in the reflective surface by exposure to acid, radiation, mechanical polishing, buffing, scraping, or the like. In some examples, the pits may be between 1 and 200 micro meters in depth.

With some examples, the reflective surface 505 may have between 80 and 95 percent reflectance for wavelengths between 200 nanometers and 5 micrometers. The reflective surface 505 and the pits 507 may then reflect incident light in a diffused pattern. That is, incident light may be reflected at more than one angle or at an irregular angle. For example, incident light 511 is depicted, which may be emitted by a LGP layer of a display stack to which the cover 500 is implemented. The cover lay reflect the incident (e.g., received) light 511 back in a diffused pattern 513.

Figure 7:
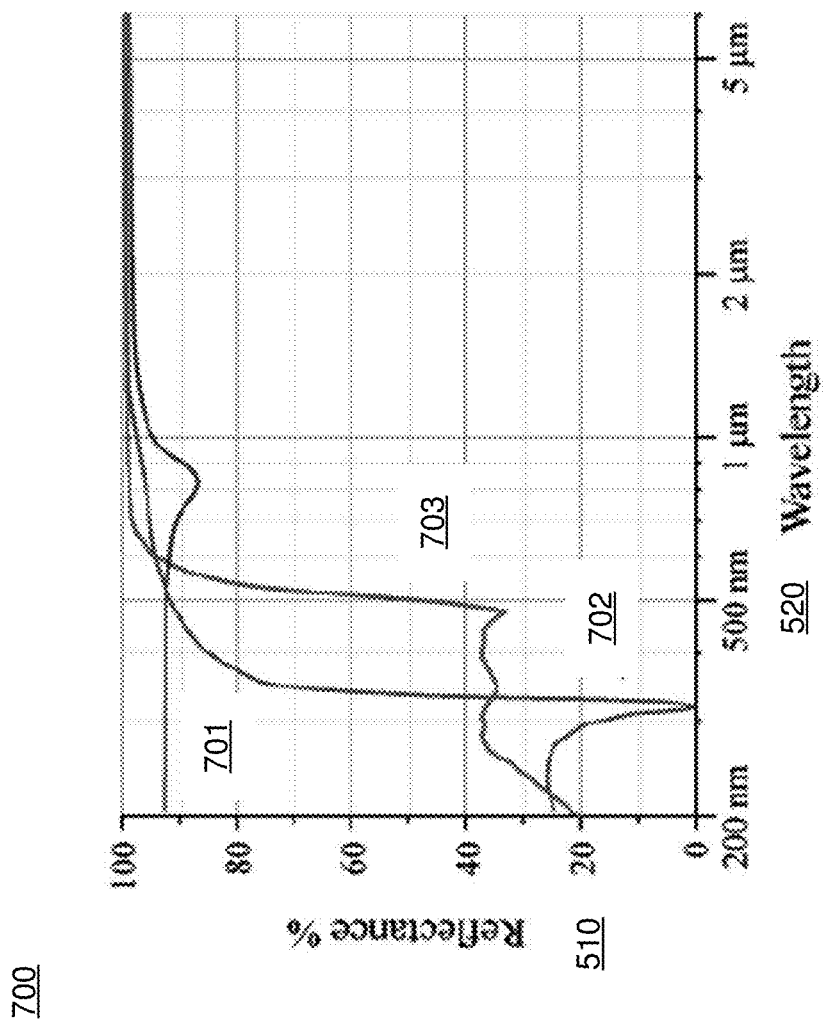
FIG. 7 illustrates a graph showing reflectance versus wavelength for various materials.

For example, FIG. 7 depicts a graph showing a percentage level of reflectance (Y axis 510) versus a wavelength of light (X axis 520) for various materials 501, 502, and 503. As depicted, various reflectance levels may be achieved using the combined EDR and back cover of the present disclosure. In particular, the reflectance of the combined EDR and back cover of the present disclosure may rival the reflectance of conventional EDR devices.

FIG. 6 illustrates a logic flow 600. The logic flow 600 may be implemented by a combined EDR and back cover, for example, the combined EDR and back cover 110, 210, or 500. The logic flow 600 may begin at block 610 "receive, at a back cover of a display stack, light emitted from a light guide panel layer." At block 610, a back cover may receive light emitted from a LGP layer of a display stack. For example, the back cover 210 may receive light emitted from the light guide panel layer 220.

Continuing to block 620, "reflect a portion of the received light back at the light guide panel layer in a diffused pattern." At block 620, the back cover may reflect a portion of the received light back at the LGP layer in a diffused pattern. For example, the back cover 500 may receive incident light 511 (e.g. light emitted from an LGP layer) and reflect a portion of the received light 511 back in a diffused pattern as reflected and diffused light 513.

Figure 8:
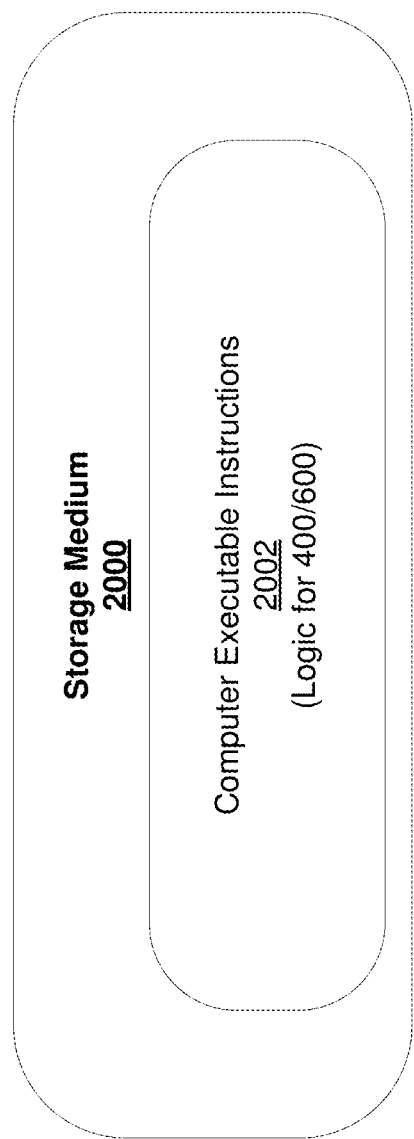
FIG. 8 illustrates a computer readable medium according to an embodiment.

FIG. 8 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 400.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
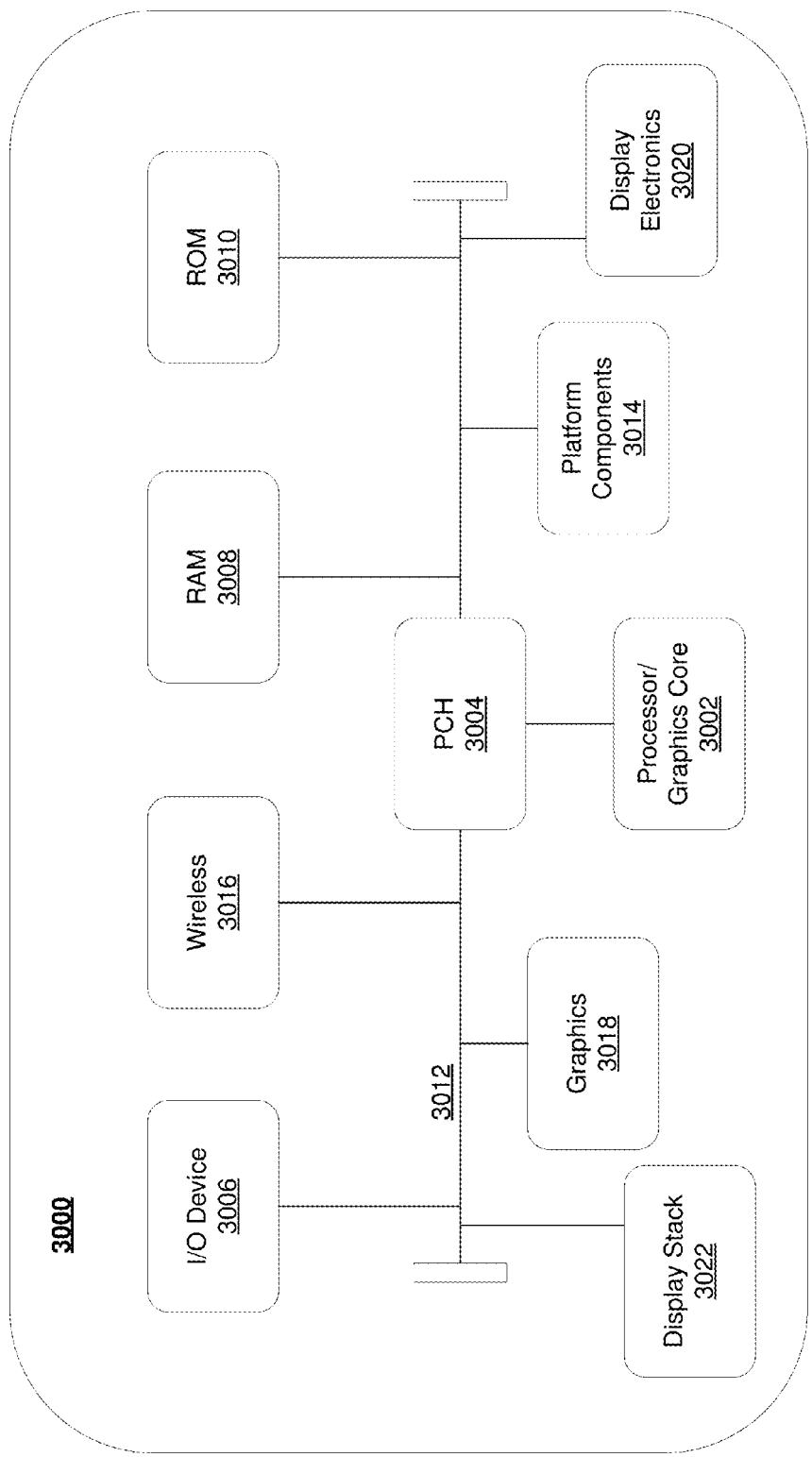
FIG. 9 illustrates another device according to an embodiment.

FIG. 9 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, display electronics 3020, display stack 3022 (e.g., including the display stack 100, the display stack 200, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Figure 10:
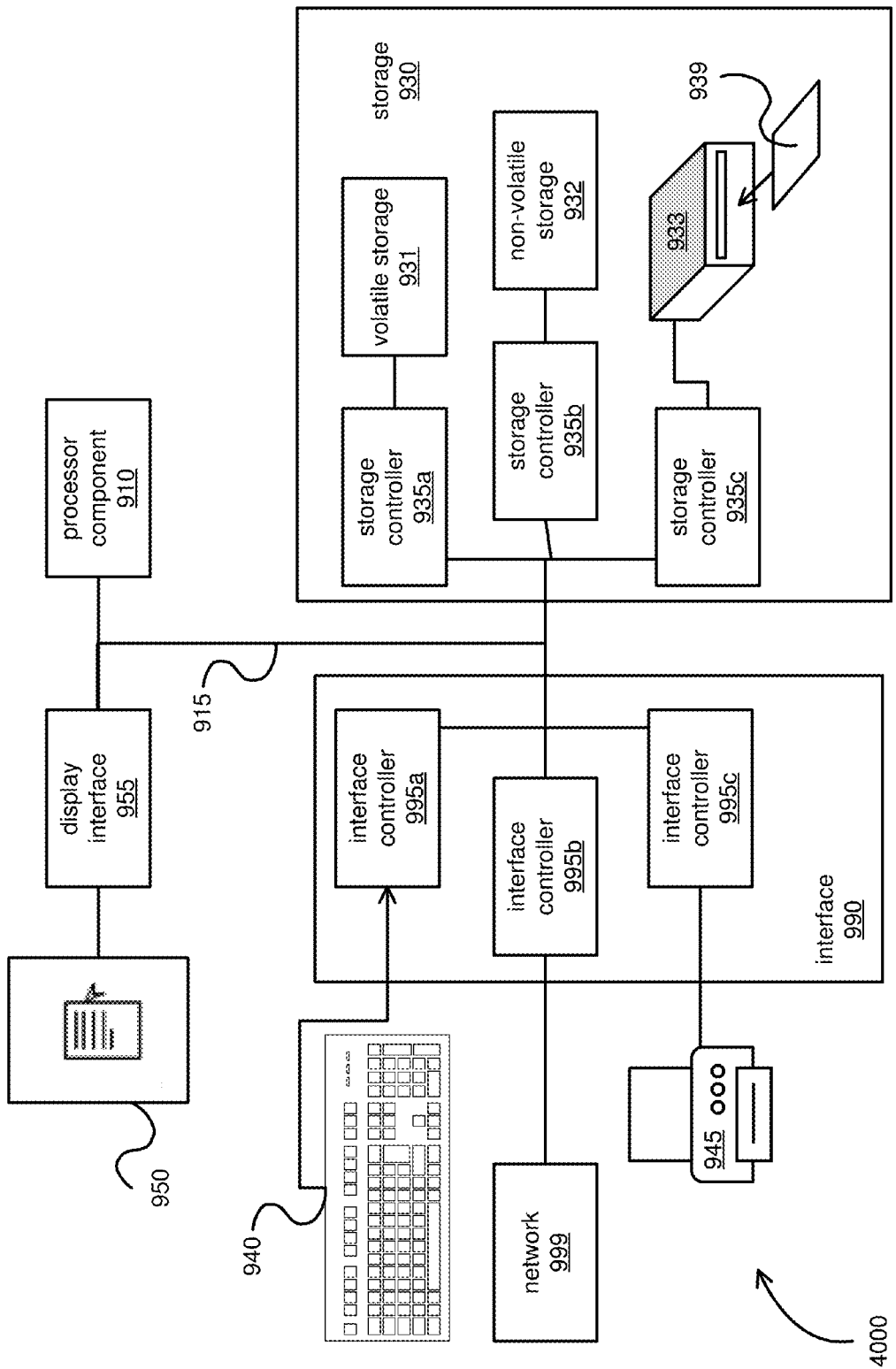
FIG. 10 illustrates still another device according to an embodiment.

FIG. 10 illustrates an embodiment of an exemplary processing architecture 4000 suitable for implementing various embodiments as previously described. More specifically, the processing architecture 4000 (or variants thereof) may be implemented as part of a system including the display stack 100 of FIG. 1, the display stack 200 of FIG. 2, or a displays tack including the combined EDR and back cover 500.

The processing architecture 4000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 4000, a computing device incorporates at least a processor element 910, a storage 930, an interface 990 to other devices, and coupling 915. Depending on various aspects of a computing device implementing the processing architecture 4000, including its intended use and/or conditions of use, such a computing device may further incorporate additional components, such as without limitation, a counter element 915.

The coupling 915 incorporates one or more buses, point-to-point interconnects, transceivers, buffers, crosspoint switches, and/or other conductors and/or logic that communicatively couples at least the processor element 910 to the storage 930. The coupling 915 may further couple the processor element 910 to one or more of the interface 990 and the display interface 955 (depending on which of these and/or other components are also present). With the processor element 910 being so coupled by couplings 915, the processor element 910 is able to perform the various ones of the tasks described at length, above, for whichever ones of the computing devices 100, 300 and 600 implement the processing architecture 4000. The coupling 915 may be implemented with any of a variety of technologies or combinations of technologies by which signals are optically and/or electrically conveyed. Further, at least portions of couplings 915 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, Serial ATA (SATA) and the like.

As previously discussed, the processor element 910 may include any of a wide variety of commercially available processors, employing any of a wide variety of technologies and implemented with one or more cores physically combined in any of a number of ways.

As previously discussed, the storage 930 may include one or more distinct storage devices based on any of a wide variety of technologies or combinations of technologies. More specifically, as depicted, the storage 930 may include one or more of a volatile storage 931 (e.g., solid state storage based on one or more forms of RAM technology), a non-volatile storage 932 (e.g., solid state, ferromagnetic, phase change, or other storage not requiring a constant provision of electric power to preserve their contents), and a removable media storage 933 (e.g., removable disc or solid state memory card storage by which information may be conveyed between computing devices). This depiction of the storage 930 as possibly comprising multiple distinct types of storage is in recognition of the commonplace use of more than one type of storage device in computing devices in which one type provides relatively rapid reading and writing capabilities enabling more rapid manipulation of data by the processor element 910 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 931 is present and is based on RAM technology, the volatile storage 931 may be communicatively coupled to coupling 915 through a storage controller 935a providing an appropriate interface to the volatile storage 931 that perhaps employs row and column addressing, and where the storage controller 935a may perform row refreshing and/or other maintenance tasks to aid in preserving information stored within the volatile storage 931. By way of another example, where the non-volatile storage 932 is present and includes one or more ferromagnetic and/or solid-state disk drives, the non-volatile storage 932 may be communicatively coupled to coupling 915 through a storage controller 935b providing an appropriate interface to the non-volatile storage 932 that perhaps employs addressing of blocks of information and/or of cylinders and sectors. By way of still another example, where the removable media storage 933 is present and includes one or more optical and/or solid-state disk drives employing one or more pieces of removable machine-readable storage media 939, the removable media storage 933 may be communicatively coupled to coupling 915 through a storage controller 935c providing an appropriate interface to the removable media storage 933 that perhaps employs addressing of blocks of information, and where the storage controller 935c may coordinate read, erase and write operations in a manner specific to extending the lifespan of the machine-readable storage media 939.

One or the other of the volatile storage 931 or the non-volatile storage 932 may include an article of manufacture in the form of a machine-readable storage media on which a routine comprising a sequence of instructions executable by the processor element 910 may be stored, depending on the technologies on which each is based. By way of example, where the non-volatile storage 932 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 932 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 910 may initially be stored on the machine-readable storage media 939, and the removable media storage 933 may be subsequently employed in copying that routine to the non-volatile storage 932 for longer term storage not requiring the continuing presence of the machine-readable storage media 939 and/or the volatile storage 931 to enable more rapid access by the processor element 910 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor element 910 to interact with input/output devices (e.g., the depicted example keyboard 940 or printer 945) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 940. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 945. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 950, which may include the display stack 100 the display stack 200, or the like), such a computing device implementing the processing architecture 4000 may also incorporate the display interface 955. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 955 in a communicative coupling of the display 950 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 200, and 400 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected"

and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

EXAMPLE 1

An apparatus, comprising: a back cover for a display stack comprising: a reflective surface to receive light from a light from a light guide panel (LGP) layer and to reflect a portion of the received light; and a plurality of pits to diffuse the reflected light.

EXAMPLE 2

The apparatus of example 1, the reflective surface comprising reflective particles layered on an internal surface of the back cover.

EXAMPLE 3

The apparatus of example 2, the reflective particles comprising one or more of aluminum, silver, or gold.

EXAMPLE 4

The apparatus of example 1, each of the plurality of pits comprising a void in the reflective surface.

EXAMPLE 5

The apparatus of example 4, each of the voids between 1 and 200 micrometers in depth.

EXAMPLE 6

The apparatus of example 1, comprising a light guide panel (LGP) layer disposed over the back cover.

EXAMPLE 7

The apparatus of example 1, comprising a liquid crystal display (LCD) layer disposed over the LGP layer, the LCD layer to receive light emitted from the LGP layer.

EXAMPLE 8

The apparatus of example 1, the LGP layer having a first surface and a second surface, the LCD layer disposed proximate to the first surface and the back cover disposed proximate to the second surface.

EXAMPLE 9

The apparatus of example 1, the back cover comprising one or more of aluminum, plastic, mild steel, carbon fiber-reinforced polymer, carbon fiber-reinforced plastic, or carbon fiber-reinforced thermoplastic.

EXAMPLE 10

The apparatus of example 1, comprising a display interface to receive a signal to include an indication of display data.

EXAMPLE 11

A system, comprising: a display stack comprising: a light guide panel (LGP) layer; and a back cover, the back cover to receive light emitted from the LGP layer and to reflect a portion of the received light back towards the LGP layer in a diffused pattern.

EXAMPLE 12

The system of example 11, the back cover having an internal surface, the internal surface comprising reflective particles layered thereon, the reflective particles to reflect the portion of the received light back towards the LGP layer.

EXAMPLE 13

The system of example 12, the reflective particles comprising one or more of aluminum, silver, or gold.

EXAMPLE 14

The system of example 12, the internal surface comprising a plurality of pits to diffuse the reflected light.

EXAMPLE 15

The system of example 14, comprising a liquid crystal display (LCD) layer disposed over the LGP layer, the LCD layer to receive light emitted from the LGP layer.

EXAMPLE 16

The system of example 14, the LGP layer having a first surface and a second surface, the LCD layer disposed proximate to the first surface and the internal surface of the back cover disposed proximate to the second surface.

EXAMPLE 17

The system of example 14, comprising a display interface to receive a signal to include an indication of display data.

EXAMPLE 18

The system of example 14, comprising a display controller operably coupled to the LCD layer and the display interface, the display controller to cause the display stack to illuminate one or more pixels based on the display data.

EXAMPLE 19

The system of example 14, comprising one or more of a touch layer, an optically clear tape layer, a pressure, film, a quantum dot enhancement film layer, or a protective layer.

EXAMPLE 20

The system of example 11, the back cover comprising one or more of aluminum, plastic, mild steel, carbon fiber-reinforced polymer, carbon fiber-reinforced plastic, or carbon fiber-reinforced thermoplastic.

EXAMPLE 21

A method comprising: depositing a plurality of reflective particles on an internal surface of a back cover for a display stack, the one or more reflective particles to reflect light; and pitting portions of the internal surface to diffuse the reflected light.

EXAMPLE 22

The method of example 21, comprising: receiving light emitted from a light guide panel (LGP) layer of the display stack by the back cover; and reflecting light back towards the LGP layer.

EXAMPLE 23

The method of example 21, comprising depositing the plurality of reflective particles on the internal surface of the back cover by: placing the back cover in a reduced pressure environment; and introducing the reflective particles into the reduced pressure environment.

EXAMPLE 24

The method of example 21, comprising depositing the plurality of reflective particles on the internal surface of the back using comprising one or more of physical vapor deposition, chemical vapor deposition (CVD), low-pressure CVD, plasma-enhanced CVD, or plasma-assisted CVD.

EXAMPLE 25

The method of example 21, comprising pitting portions of the internal surface by exposing the internal surface to radiation or exposing the internal surface to an acid.

EXAMPLE 26

The method of example 21, comprising assembling the display stack to include the back cover.

EXAMPLE 27

The method of example 26, the display stack to include one or more of a light guide panel layer, a liquid crystal display layer, a touch layer, an optically clear tape layer, a pressure, film, a quantum dot enhancement film layer, or a protective layer.

EXAMPLE 28

A method comprising: receiving, at a back cover of a display stack, light emitted from a light guide panel (LGP) layer of the display stack; and reflecting a portion of the received light back to the LPG layer in a diffused pattern.

EXAMPLE 29

The method of example 28, comprising reflecting a portion of the received light by a reflective surface of the back cover.

EXAMPLE 30

The method of example 29, the reflective surface comprising a plurality of reflective particles.

EXAMPLE 31

The method of example 30, the plurality of reflective particles comprising one or more of aluminum, silver, or gold.

EXAMPLE 32

The method of example 29, comprising diffusing the reflected light by a plurality of pits in the reflective surface.

EXAMPLE 33

The method of example 32, each of the plurality of pits having a depths between 1 and 200 micrometers.

EXAMPLE 34

An apparatus comprising: receiving means to receive light emitted from a light guide panel (LGP) layer of a display stack at a back cover of the display stack; and reflecting means to reflect a portion of the received light back to the LPG layer in a diffused pattern.

EXAMPLE 35

The apparatus of example 34, the reflecting means comprising a reflective surface of the back cover to reflect a portion of the received light.

EXAMPLE 36

The apparatus of example 35, the reflective surface comprising a plurality of reflective particles layered on an internal surface of the back cover.

EXAMPLE 37

The apparatus of example 36, the plurality of reflective particles comprising one or more of aluminum, silver, or gold.

EXAMPLE 38

The apparatus of example 35, the reflecting means comprising a plurality of pits in the reflective surface to diffuse the reflected light.

EXAMPLE 39

The apparatus of example 38, each of the plurality of pits having a depths between 1 and 200 micrometers.

EXAMPLE 40

The apparatus of example 40, comprising: a light guide panel means to receive light from a light source and distribute the light to a liquid crystal display means.

What is claimed is:

1. An apparatus, comprising:
    a back cover for a display stack comprising:
        a reflective surface to receive light from a light guide panel layer (LGP) and to reflect a portion of the received light; and
        a plurality of pits in the reflective surface to diffuse the reflected light, each of the plurality of pits comprising a void in the reflective surface, wherein the display stack does not include a diffuser.
2. The apparatus of claim 1, the reflective surface comprising reflective particles layered on an internal surface of the back cover.
3. The apparatus of claim 2, the reflective particles comprising one or more of aluminum, silver, or gold.
4. The apparatus of claim 1, comprising the LGP layer disposed over the back cover.
5. The apparatus of claim 1, comprising a liquid crystal display (LCD) layer disposed over the LGP layer, the LCD layer to receive light emitted from the LGP layer.
6. The apparatus of claim 5, the LGP layer having a first surface and a second surface, the LCD layer disposed proximate to the first surface and the back cover disposed proximate to the second surface.
7. The apparatus of claim 1, the back cover comprising one or more of aluminum, plastic, mild steel, carbon fiber-reinforced polymer, carbon fiber-reinforced plastic, or carbon fiber-reinforced thermoplastic.
8. The apparatus of claim 1, comprising a display interface to receive a signal to include an indication of display data.
9. A system, comprising:
    a display stack comprising:
        a light guide panel (LGP) layer; and
        a back cover, the back cover comprising a reflective surface to receive light emitted from the LGP layer and to reflect a portion of the received light back towards the LGP layer; and
        a plurality of pits in the reflective surface to diffuse the reflected light, each of the plurality of pits comprising a void in the surface, wherein the display stack does not include a diffuser.
10. The system of claim 9, the back cover having an internal surface, the internal surface comprising reflective particles layered thereon, the reflective particles to reflect the portion of the received light back towards the LGP layer.
11. The system of claim 10, the reflective particles comprising one or more of aluminum, silver, or gold.
12. The system of claim 9, comprising a liquid crystal display (LCD) layer disposed over the LGP layer, the LCD layer to receive light emitted from the LGP layer.
13. The system of claim 12, the LGP layer having a first surface and a second surface, the LCD layer disposed proximate to the first surface and the internal surface of the back cover disposed proximate to the second surface.
14. The system of claim 12, comprising a display interface to receive a signal to include an indication of display data.
15. The system of claim 14, comprising a display controller operably coupled to the LCD layer and the display interface, the display controller to cause the display stack to illuminate one or more pixels based on the display data.
16. The system of claim 9, comprising one or more of a touch layer, an optically clear tape layer, a pressure, film, a quantum dot enhancement film layer, or a protective layer.
17. The system of claim 9, the back cover comprising one or more of aluminum, plastic, mild steel, carbon fiber-reinforced polymer, carbon fiber-reinforced plastic, or carbon fiber-reinforced thermoplastic.
18. A method comprising:
    depositing a plurality of reflective particles on an internal surface of a back cover for a display stack, the plurality of reflective particles to reflect light; and
    pitting portions of the internal surface to diffuse the reflected light, each of the pitted portions to comprise a void in the reflective surface, wherein the display stack does not include a diffuser.
19. The method of claim 18, comprising:
    receiving light emitted from a light guide panel (LGP) layer of the display stack by the back cover; and
    reflecting light back towards the LGP layer.
20. The method of claim 18, comprising depositing the plurality of reflective particles on the internal surface of the back cover by:
    placing the back cover in a reduced pressure environment; and
    introducing the reflective particles into the reduced pressure environment.
21. The method of claim 18, comprising depositing the plurality of reflective particles on the internal surface of the back cover using one or more of physical vapor deposition, chemical vapor deposition (CVD), low-pressure CVD, plasma-enhanced CVD, or plasma-assisted CVD.
22. The method of claim 18, comprising pitting portions of the internal surface by exposing the internal surface to radiation or exposing the internal surface to an acid.
23. The method of claim 18, the display stack to include one or more of a light guide panel layer, a liquid crystal display layer, a touch layer, an optically clear tape layer, a pressure, film, a quantum dot enhancement film layer, or a protective layer.

* * * * *